United States Patent [19]

Uschold

[11] Patent Number: 5,250,597
[45] Date of Patent: Oct. 5, 1993

[54] FLUOROPOLYMER FILM PREPARATION

[75] Inventor: Ronald E. Uschold, West Chester, Pa.

[73] Assignee: E. I. Du Pont de Nemours and Company, Wilmington, Del.

[21] Appl. No.: 900,749

[22] Filed: Jun. 19, 1992

Related U.S. Application Data

[63] Continuation of Ser. No. 725,169, Jul. 3, 1991, abandoned.

[51] Int. Cl.$^5$ ............................................. C08K 5/10
[52] U.S. Cl. ..................................... 524/280; 524/545
[58] Field of Search ........................... 524/280, 545

[56] References Cited

U.S. PATENT DOCUMENTS

| | | | |
|---|---|---|---|
| 3,607,827 | 9/1971 | Dukert | 524/545 |
| 3,895,029 | 7/1975 | Ward | 524/520 |
| 3,944,689 | 3/1976 | Luckock et al. | 524/520 |

Primary Examiner—Joseph L. Schofer
Assistant Examiner—Peter D. Mulcahy

[57] ABSTRACT

Preparation of poly(vinyl fluoride) films with minimal defects is aided by the incorporation of toluene in the casting dispersion.

2 Claims, No Drawings

FLUOROPOLYMER FILM PREPARATION

This is a continuation of application Ser. No. 07/725,169 filed Jul. 3, 1991, now abandoned.

BACKGROUND OF THE INVENTION

Some fluoropolymers, such as poly(vinyl fluoride), are only moderately soluble in conventional solvents. According, such polymers are generally cast into their final configuration from a dispersion, and coalesced to form an integral structure.

In the preparation of poly(vinyl fluoride) films for which a high degree of clarity is required, the use of propylene carbonate as the solvent or dispersant has been found to be particularly useful. However, while films and coatings prepared from propylene carbonate dispersions are generally characterized by excellent clarity, occasional defects, in the form of pin holes or "fish eyes," result in yield loss.

SUMMARY OF THE INVENTION

The present invention provides an improvement in the preparation of fluoropolymer films which markedly improves the yield of dispersion casting processes in which propylene carbonate is used as the dispersant.

Specifically, the present invention provides, in the process for preparing a film by dispersing poly(vinyl fluoride) in propylene carbonate, casting the resulting dispersion onto a substrate, and heating to coalesce the polymer and remove the dispersant, the improvement which comprises incorporating into the dispersion about from 10 to 50% by weight of the total dispersant, of toluene.

The present invention further provides a dispersion comprising poly(vinyl fluoride) and propylene carbonate dispersant, and about from 10 to 50%, by weight of the total dispersant, of toluene.

DETAILED DESCRIPTION OF THE INVENTION

The present invention is directed to the preparation of films and coatings of poly(vinyl fluoride) (PVF). These are prepared from a dispersion of the PVF in propylene carbonate. In the preparation of the dispersion, particulate polymer is typically combined with dispersant and dispersed with the aid of a mill. PVF dispersions which can be used include those described in detail in Barton et al. U.S. Pat. No. 2,953,818 and Prengle et al. U.S. Pat. No. 3,139,470, both of which are hereby incorporated by reference.

The PVF and one or more of the dispersants are generally first milled together. A wide variety of mills can be used for the preparation of the dispersion. Typically, the mill used employs a dense agitated grinding medium, such as sand, as in a ball mill, an Attritor, or a Netzsch mill.

The concentration of PVF in the dispersion will vary with particle size of the particular polymer and the process equipment and conditions used. The particle size of the PVF is typically about from 0.05 to 5.0 microns, and preferably about from 0.2 to 1.00 microns. In general, the fluoropolymer will comprise about from 30 to 45% by weight of the dispersion.

The crux of the present invention lies in the incorporation of about from 10 to 50%, by total weight of the dispersant, of toluene. Preferably, the toluene comprises about from 15 to 30% of the weight of the total dispersant, that is, the combined weight of the propylene carbonate and the toluene. The toluene can be combined with the PVF along with the propylene carbonate, or a dispersion of the PVF in propylene carbonate can first be prepared and the toluene subsequently added.

The fluoropolymer is formed into its desired configuration by casting the dispersion onto a substrate, using any conventional means, such as spray, roll, knife, curtain, gravure coaters, or any other method that permits the application of a uniform film without streaks or other defects. The thickness of the cast dispersion is not critical, so long as the resulting film has sufficient thickness to be self-supporting and be satisfactorily removed from the substrate onto which the dispersion is cast. In general, a thickness of at least about 0.25 mil is satisfactory, and thicknesses of up to about 15 mils can be made using the dispersion casting techniques of the present invention.

A wide variety of substrates can be used for forming films according to the present invention, depending on the particular polymer and the coalescing conditions. The surface onto which the dispersion is cast should be selected to provide easy removal of the finished film after it is coalesced. Other polymeric films or steel belts can, for example, be used. Oriented polyethylene terephthalate films have been found to provide particularly good performance in the production of fluoropolymer films with excellent surface characteristics.

After casting onto the substrate, the dispersion is heated to coalesce the polymer into a film. The conditions used to coalesce the polymer will vary with the polymer used, the thickness of the cast dispersion, and other operating conditions. However, typically, for poly(vinyl fluorides), oven temperatures of about from 340° to 480° F. can be used to coalesce the film, and temperatures of about from 380° to 450° F. have been found to be particularly satisfactory. The oven temperatures, of course, are not representative of the temperatures of the polymer being treated, which will be lower.

After coalescence, the finished film is stripped from the substrate according to usual techniques.

The process of the present invention results in films of excellent clarity and freedom from the surface defects such as pin holes and fish eyes that often reduce yields in casting operations of this type.

The present invention is further illustrated by the following specific examples, in which parts and percentages are by weight unless otherwise indicated.

EXAMPLE 1

A dispersion of poly(vinyl fluoride) (PVF) was prepared by milling together 15 parts PVF, 7.5 parts toluene and 17.5 parts propylene carbonate for 60 minutes, while maintaining the temperature below 40 degrees Centigrade.

The resulting dispersion was coated onto a polyester film 2 mils thick by means of a 40TH gravure roll to give a coating about 2 mils thick. The coating was then coalesced by passing the wet film through a circulating air oven maintained at 210 degrees Centigrade. A residence time of 45 seconds in the oven was maintained. The dry, coalesced, coating was 0.75 mil thick. It was examined for defects and and found to contain none.

COMPARATIVE EXAMPLE A

The general procedure of Example 1 was repeated, except that the toluene was not incorporated into the dispersion. Instead, 15 parts of PVF and 25 parts of propylene carbonate were milled together to give a dispersion of substantially the same solids. The resulting coating was examined as before, and found to contain 1.1 pinholes per square meter.

EXAMPLES 2-4

Polymer dispersions were prepared substantially as in Example 1, except that the relative amounts of toluene and propylene carbonate were varied as shown in the Table. The resulting coalesced coatings were examined as before and the results are summarized in the Table.

TABLE

| Example | Toluene | Propylene Carbonate | PVF | Pinholes in Coalesced Film no./sq. m |
|---|---|---|---|---|
| 2 | 2.5 | 22.5 | 15 | 0.3 |
| 3 | 5 | 20 | 15 | 0 |
| 4 | 10 | 15 | 15 | 0 |

I claim:
1. A dispersion comprising poly(vinyl fluoride) and propylene carbonate dispersant, and about from 10 to 50%, by weight of the total dispersant, of toluene.
2. A dispersion of claim 1 wherein the toluene comprises about from 15 to 30% of the total dispersant.

* * * * *